(12) United States Patent
Inuguri et al.

(10) Patent No.: US 12,681,914 B2
(45) Date of Patent: Jul. 14, 2026

(54) METHOD AND SYSTEM TO EFFICIENTLY ABORT A DATABASE TRANSACTION

(71) Applicant: Oracle International Corporation, Redwood Shores, CA (US)

(72) Inventors: Sarat Inuguri, Milpitas, CA (US); Kishy Kumar, Santa Clara, CA (US); Ajit Mylavarapu, Mountain View, CA (US); Sue Kyong Lee, Emerald Hills, CA (US); Manoj Dhanapal, Seattle, WA (US); Subrata Sen, Mumbai (IN); Tirthankar Lahiri, Los Altos Hills, CA (US); Sanjay Singh, Redwood City, CA (US); Mukul Pandey, Bengaluru (IN)

(73) Assignee: Oracle International Corporation, Redwood Shores (CA)

( * ) Notice: Subject to any disclaimer, the term of this patent is extended or adjusted under 35 U.S.C. 154(b) by 241 days.

(21) Appl. No.: 18/115,663

(22) Filed: Feb. 28, 2023

(65) Prior Publication Data

US 2024/0289318 A1 Aug. 29, 2024

(51) Int. Cl.
*G06F 16/23* (2019.01)
*G06F 9/48* (2006.01)

(52) U.S. Cl.
CPC ........ *G06F 16/2343* (2019.01); *G06F 9/4881* (2013.01)

(58) Field of Classification Search
CPC ........................... G06F 16/2343; G06F 9/4881
See application file for complete search history.

(56) References Cited

U.S. PATENT DOCUMENTS

| | | | | |
|---|---|---|---|---|
| 10,296,759 | B1 * | 5/2019 | Holenstein | G06F 9/466 |
| 10,298,459 | B2 * | 5/2019 | Tanaka | H04L 41/0896 |
| 11,429,388 | B2 * | 8/2022 | Thomsen | G06F 9/30123 |
| 2007/0106667 | A1 * | 5/2007 | Jain | G06F 16/2343 |
| 2010/0191884 | A1 * | 7/2010 | Holenstein | G06F 16/2343 |
| | | | | 707/613 |
| 2010/0257152 | A1 * | 10/2010 | Hrle | G06F 16/2453 |
| | | | | 707/715 |
| 2015/0212851 | A1 * | 7/2015 | Busaba | G06F 9/38585 |
| | | | | 711/151 |
| 2016/0350124 | A1 * | 12/2016 | Gschwind | D01F 8/06 |
| 2017/0039234 | A1 * | 2/2017 | Wagle | G06F 16/2322 |
| 2017/0199758 | A1 * | 7/2017 | Gschwind | G06F 9/466 |
| 2017/0199759 | A1 * | 7/2017 | Gschwind | G06F 9/466 |
| 2019/0347250 | A1 * | 11/2019 | Schaub | G06F 16/2322 |
| 2022/0012226 | A1 * | 1/2022 | Mihály | G06F 16/2308 |

(Continued)

OTHER PUBLICATIONS

Leith, M., "Finding and killing long running InnoDB transactions with Events," Planet MySQL, dated May 31, 2011.

(Continued)

*Primary Examiner* — Kris E Mackes
(74) *Attorney, Agent, or Firm* — Vista IP Law Group, LLP

(57) ABSTRACT

Disclosed is an approach to autonomously abort a lower priority transaction that is blocking a higher priority transaction, where the lower priority transaction is holding a lock on a resource for which there is contention. Some approaches also provide an efficient way to implement identification of a blocker transaction, which drastically reduces the response time to abort the blocker transaction.

28 Claims, 15 Drawing Sheets

(56) References Cited

U.S. PATENT DOCUMENTS

| | | | |
|---|---|---|---|
| 2022/0138175 A1* | 5/2022 | Mahendra Kumar | ..................... G06F 16/2365 707/694 |
| 2024/0184766 A1* | 6/2024 | Ng | ..................... G06F 16/273 |

OTHER PUBLICATIONS

Randal, P., "SQLskills SQL101: Should you kill that long-running transaction?," SQLskills, dated Oct. 10, 2017.

"Interrupt a Long-Running Query," SQLite, URL: https://www.sqlite.org/c3ref/interrupt.html, date found via Google as Aug. 24, 2008.

Campos, H., et al., "Long-Running Transactions," Microsoft BizTalk, dated Feb. 1, 2021.

Dias, A., "Finding and killing long running queries on PostgreSQL," Medium, dated Jul. 6, 2016.

Kharwar, R., "Query to kill transactions that take longer than X seconds and doesn't contain certain keywords," Knowledge Base, URL: https://neo4j.com/developer/kb/query-to-kill-transactions-that-take-longer/, date found via Google as Sep. 9, 2017.

Bruce, E., "Query to Find and Kill Long Running Transactions in SQL Server 2008 R2 or 2012," Chaya—Digital Zen, dated Sep. 22, 2014.

Lipiński, S., "Are Long Running Transactions Bad?," Programming & Databases, dated Feb. 28, 2011.

* cited by examiner

Fig. 7

METHOD AND SYSTEM TO EFFICIENTLY ABORT A DATABASE TRANSACTION

BACKGROUND

A database is an organized collection of structured information, or data, typically stored electronically in a computer system. A database is usually controlled by a database management system (DBMS), which is the management infrastructure that is used to control and operate upon the database. Data within the most common types of databases in operation today is typically modeled in rows and columns in a series of tables to make processing and data querying efficient. The data can then be easily accessed, managed, modified, updated, controlled, and organized. Most databases use structured query language (SQL) for writing and querying data.

Entities often need to access one or more resources within the database to perform work in the system. For example, an entity (e.g., a transaction, process, thread, instance, etc.) may need to access one or more rows within a database table in order to query from or make modifications to content within those rows. In modern database systems, at any moment in time, there may be an extremely large number of concurrent entities that seek to access the resources in the database system. However, conflicts may arise if multiple entities are permitted to perform incompatible accesses to the same resources at the same time. For example, if two entities are permitted to write to the same piece of data at the same time, then possible errors or coherency uncertainties could arise with respect to the status or content of that piece of data. The issue of coherency and access conflicts becomes even more complex in a multi-instance database system that allows common access to a single database across multiple networked nodes, such as occurs with clustered database systems.

To prevent such conflicts from occurring in a computing system, various mechanisms may be implemented to manage the type, number, and/or ordering of accesses that are permitted to resources in the system. A common mechanism that is used to synchronize and manage access to resources in computing and database systems is referred to as a "lock". A lock is a data structure that indicates whether or which particular entities have been granted rights to a resource. An entity must acquire a lock to a resource before the entity is permitted to access the resource.

The scope of possessory or access rights granted to an entity for a particular resource is often related to the type of work that the entity intends to perform upon that resource. For example, an "exclusive lock" could be granted to an entity that seeks to access a data item in a way that is incompatible with concurrent access by other entities, e.g., to modify, write or delete the data item. The exclusive lock therefore grants exclusive access to the data item, which prevents other entities from being able to concurrently access the same data item at the same time. This type of lock essentially serializes access to its corresponding resource. A "shared lock" could be granted if an entity wishes to perform activities upon a resource which can also be concurrently performed with activities by other entities upon the same resource without introducing conflicts or inconsistencies to the data, e.g., to read a data item. Therefore, the shared lock can be concurrently granted to multiple entities for the same resource at the same time. Depending upon the exact configuration of the computing or database system, other types of locks and lock scopes can be implemented to manage access to data.

The combination of locks granted for a resource is generally managed to avoid allowing incompatible activities upon that resource. For example, if an exclusive lock has been granted to a first entity for a data item, then no other lock requests are normally granted to that same data item until the first entity has completed its work and released the exclusive lock. All other lock requests, and their corresponding data access activities, are placed on hold until the lock requests are granted. If a shared lock has been granted to one or more entities for a data item, then subsequent requests for a shared lock upon the same data item can be concurrently granted. However, a subsequent request for an exclusive lock will be placed on hold until the previously granted shared locks have been released.

It is therefore an intentional design feature of systems that use exclusive locks to create a first class of entities (blockers) that hold locks which can block a second class of entities (waiters) from being able to immediately obtain the lock in order to process its work. This approach serves very well to prevent inconsistent states of data within the database system.

However, conventional database systems tend to treat every entity with the same level of importance when they are acquiring locks on resources in the system. This means that, when it comes to obtaining and holding locks in the system, a first entity that is performing an operation in the database involving work having very little importance (e.g., a small dollar financial transaction) is typically treated exactly the same way as a second entity that is performing an operation in the database involving work having a very high level of importance (e.g., a multi-billion dollar financial transaction). If the small-dollar transaction just happens to arrive earlier into a work queue than the large-dollar transaction, then it will first be able to take an exclusive lock on a resource that is also needed by the high-dollar transaction, and the high dollar transaction thereby becomes a waiter that is prevented from doing its work due to the low-dollar transaction being a blocker. This situation may cause violations of the terms of strict SLAs (service level agreements) for organizations that cannot tolerate the blocking of important transactions. The problem is further exacerbated if the blocker transaction just happens to be a long-running transaction that is incurring excessive processing latencies or a lengthy processing time period (e.g., because exclusive locks can only be dropped when the transaction commits or aborts). This problem can severely and negatively impact the business operations for an organization.

Conventionally, the only way to address this situation is for a DBA (database administrator) to closely monitor the database for this situation, and to manually correct the problem if identified. However, this approach is a very suboptimal and unreliable solution, especially if the DBA fails to notice the situation or fails to adequately take corrective action.

Therefore, there is a need for an improved approach to implement a solution that addresses such situations.

SUMMARY

Some embodiments are directed to an improved approach to abort a lower priority transaction that is blocking a higher priority transaction. In some embodiments, transactions are configured to have a specific priority level. For example, one embodiment of the invention is implemented such that there are three priority levels, including high priority, medium priority, and low priority. This serves to categorize the different transactions within the database system into differing tiers of priority in a manner that is formally recognizable and actionable by the database.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 7 shows a chart/interface for setting the priority levels and associated abort rules for the respective priority levels.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

Some embodiments of the invention are directed to a mechanism that is capable of automatically aborting a low importance transaction in favor of a higher importance transaction when that low importance transaction becomes a blocker to the high importance transaction. This abort processing would thereafter cause the release of a lock previously held by the low importance transaction, and permit the high importance transaction to progress in its work.

Figure 1:
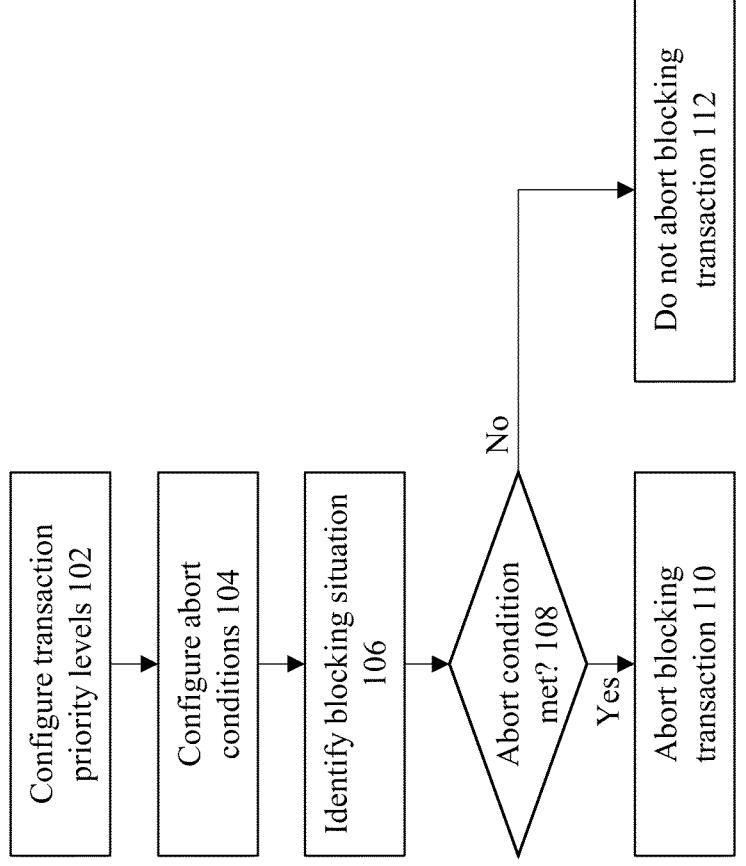
FIG. 1 shows a flowchart of an approach to implement some embodiments of the invention.

FIG. 1 shows a flowchart of an approach to implement some embodiments of the invention. At step 102, transactions are configured to have a specific priority level. For example, one embodiment of the invention is implemented such that there are three priority levels, including high priority, medium priority, and low priority. This serves to categorize the different transactions within the database system into differing tiers of priority/importance in a manner that is formally recognizable and actionable by the database. A transactions table may be maintained that identifies the transactions in the database, where that transaction table will be configured to include a column for each transaction entry that identifies the priority level for that transaction. In some embodiments, by default, a transaction would be associated with a high priority level.

The configuration of a transaction to be at a specific priority level may be implemented by configuring any level of granularity of entities within the system that relates to a transaction in some way. For example, some embodiments of the invention would set the priority value at the granularity level of a session, where an "ALTER SESSION SET . . . " statement is used to set the priority level for a session. With this approach, the priority level of the session would be inherited by the transactions within that session. Alternatively, another possible approach is to directly set the priority level for each given transaction, without the necessity to do so at the level of a session.

Any number of priority levels may be used in embodiments of the invention. The above-described embodiment uses three priority levels (high, medium, low), but another possible embodiment may use just two priority levels (high, low). Indeed, other embodiments may use a much greater number of priority levels without deviating from the principles of the current invention, and without limitation to the scope of the invention.

The DBA may manually assign priority levels to transactions/sessions in the system. Alternatively, the priority levels may be automatically assigned using a set of rules or through a learning process. Priority levels may be automatically assigned on the basis of any characteristics, such as service characteristic, user characteristics, data characteristics, query characteristics, etc. For example, a transaction for a first service may get a high priority setting, but a transaction for a second service may get a low priority setting. As another example, a transaction for a first user may get a high priority setting, but a transaction for a second user may get a low priority setting.

At 104, an abort condition is configured for the system. By way of example, some embodiments configure a system-wide time duration for a length of time that a transaction at a given priority level should wait for a lock. This time duration becomes a time value condition that is evaluated by the system in determining whether to abort a lower priority blocking transaction.

It is noted that in one embodiment, the time duration is a target value (not an absolute value), since there may be multiple blockers and waiters in the system, where each of the blockers and waiters are at respective priority levels and may have differing entry time points that start the time clock for assessing the time duration condition. It is noted that in the current embodiment, wait targets can be specified only for the high and medium priority transactions. Low priority transactions cannot be used to abort other transactions, and hence there is no need for a wait target for this priority level.

At 108, if there are blockers and waiters in the system, then a determination is made whether any abort conditions have been met. In particular, a determination is made whether: (a) a lower priority transaction has blocked a transaction that has higher priority; and (b) if a lock contention (e.g., a row lock contention) has been detected over the configured wait target value.

If the abort conditions are not met, then at 112, the blocking transaction is not aborted. Instead, the blocking transaction continues its processing, and the waiters continue to wait on the wait queue until the blocking transaction has released its lock.

On the other hand, if the abort conditions are met, then at 110, the blocking transaction is aborted. Various clean-up and recovery steps are taken within a database system to resolve any open issues from the abort/early termination of a transaction, such as possibly the application of redo/undo logs to remove any uncommitted changes from data affected by the aborted transaction. For purposes of this disclosure, a notable clean-up action is the release of any locks held by the aborted transaction. The release of these lock therefore frees up the underlying resources that the waiting transaction was previously unable to access. At this point, the high priority transaction should be able to obtain its desired lock on the freed resources and should be able to perform its intended work.

Figure 2:
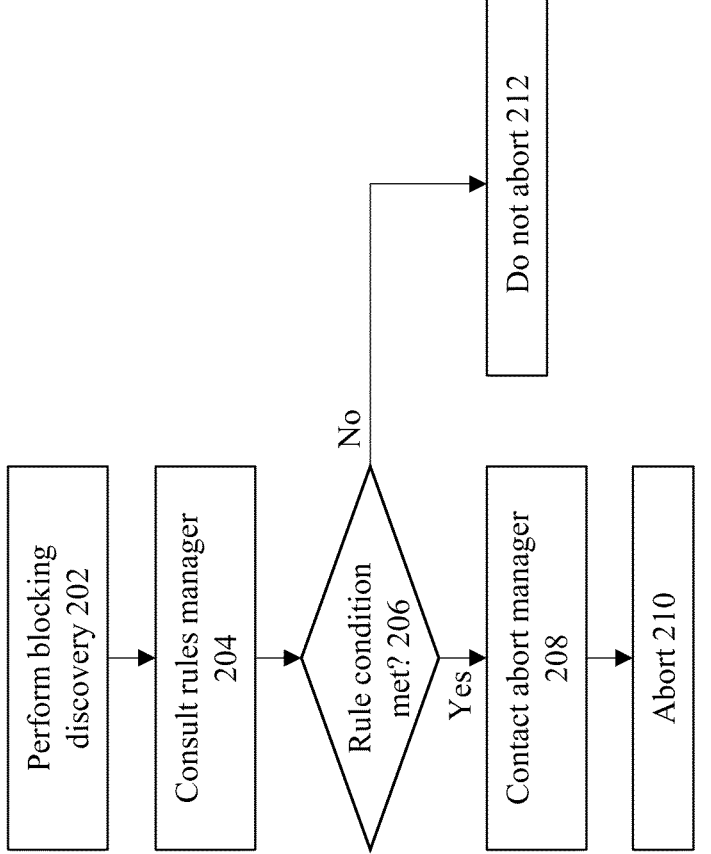
FIG. 2 provides a more detailed flowchart of actions performed by some embodiments of the invention.
Figure 3A:
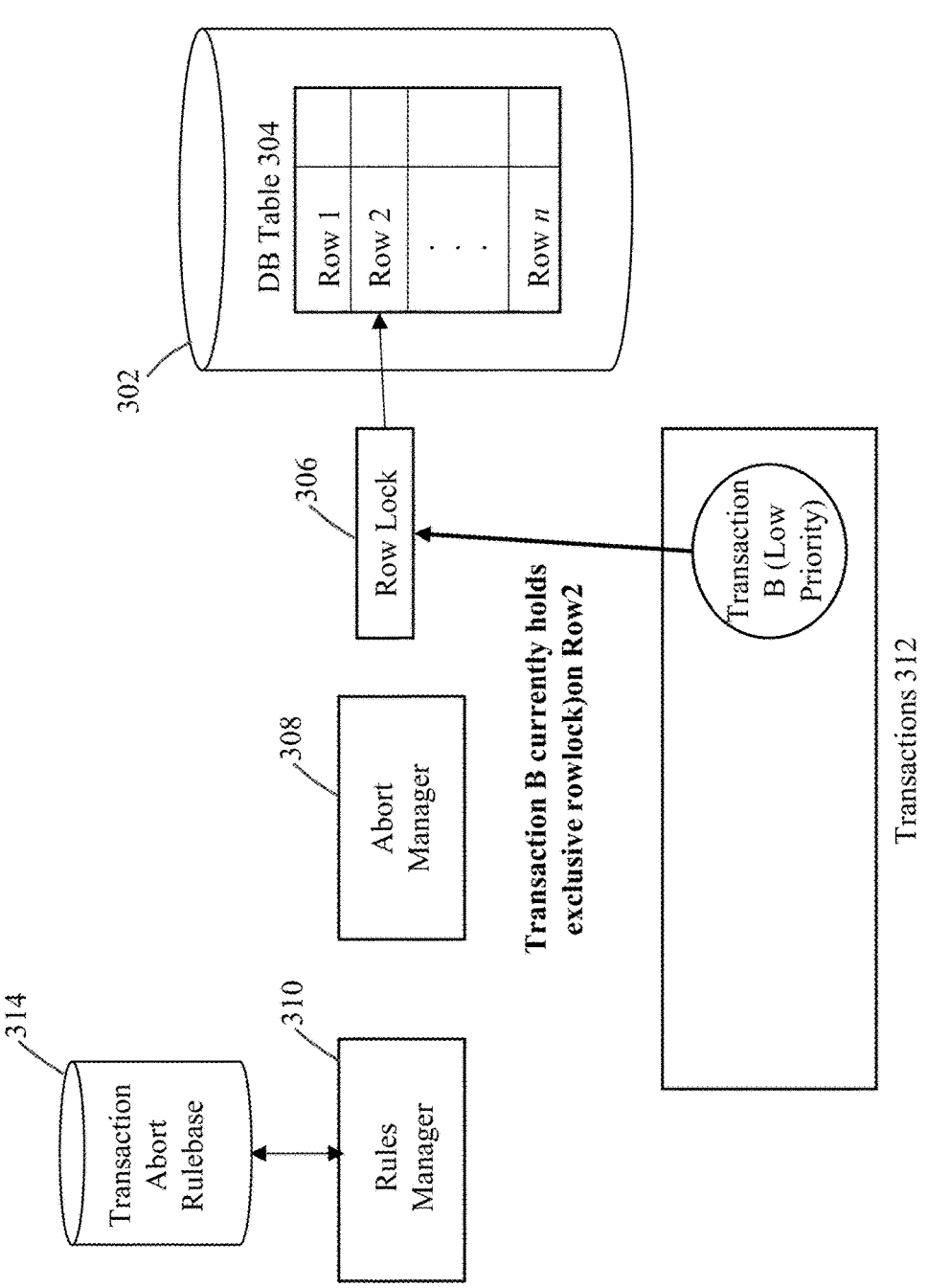
FIGS. 3A-G provides an illustrative example of some embodiments of the invention.

FIG. 2 provides a more detailed flowchart of actions performed by some embodiments of the invention. This flow is explained in conjunction with the illustrative example shown in FIGS. 3A-G. FIG. 3A shows some components of a database system having a DBMS that manages a database 302 having a database table 304. One or more database applications (not shown) can be used by one or more users/clients within the system to implement transactions within the system. One or more users/clients may operate a user station to issue commands to be processed by the database system upon one or more database tables. The user stations and/or the servers that host the database comprises any type of computing device that may be used to implement, operate, or interface with the database system. Examples of such devices include, for example, workstations, personal computers, mobile devices, servers, hosts, nodes, or remote computing terminals. The user station comprises a display device, such as a display monitor, for displaying a user interface to users at the user station. The user station also comprises one or more input devices for the user to provide operational control over the activities of the database system, such as a mouse or keyboard to manipulate a pointing object in a graphical user interface to generate user inputs. The database system is communicatively coupled to a storage device that may hold the database. The storage device comprises any storage device that may be employed by the database system to hold storage content. The storage device may be implemented as any suitable type of storage that can hold storage content, such as e.g., a hard disk drive (HDD) or a solid disk drive (SSD). The storage device can be implemented using any suitable architecture or form factor according to embodiments of the invention, e.g., as direct attached storage, NAS (networked attached storage), or as a cloud-based storage service.

Users and/or any database applications operated by the user may interact with the database system by submitting commands that cause the database server to perform operations on data stored in a database. For the database server to process the commands, the commands typically conform to a database language supported by the database server. An example of a commonly used database language supported by many database servers is known as the Structured Query Language (SQL).

When a database server receives the original statement of a database command from a database application, the database server must first determine which actions should be performed in response to the database command, and then perform those actions. The act of preparing for performance of those actions is generally referred to as "compiling" the database command, while performing those actions is generally referred to as "executing" the database command.

A database "transaction" corresponds to a unit of activity performed at the database that may include any number of different statements or commands for execution. ACID (Atomicity, Consistency, Isolation, Durability) is a set of properties that guarantees that database transactions are processed reliably. Atomicity requires that each transaction is all or nothing; if any part of the transaction fails, then the database state should not be changed by the transaction. Consistency requires that a database remains in a consistent state before and after a transaction. Isolation requires that other operations cannot see the database in an intermediate state caused by the processing of a current transaction that has not yet committed. Durability requires that, once a transaction is committed, the transaction will persist. Write-ahead logging is used to record all modifications performed on the database before they are applied. No changes are made to the database before the modifications are recorded. Furthermore, no transaction is acknowledged as committed until all the modifications generated by the transaction or depended on by the transaction are recorded. In this manner, write-ahead logging ensures atomicity and durability.

The database system includes a rules manager 310. The rules manager 310 provides an interface to configure the rules in a rulebase 314, where the rules are configured to govern the circumstances for a blocker transaction to be autonomously aborted. For example, the rules manager may be used to configure a rule that specifies that a waiter transaction with high priority can only abort medium and low priority blocker transactions, and that a transaction with low priority cannot abort any transaction. Therefore, the rules manager corresponds to a mechanism that is used to configure the rules, configure for active or idle blockers, account for a number of waiters, as well as other conditional factors. Additional example of possible rules are described in more detail below.

An interface may be provided for DBAs to configure the allowable priorities in the database (for e.g. LOW, MEDIUM and HIGH), wait targets for each priority, and abort rules. This is to configure and decide whether and when a blocker transaction can be aborted. Whenever a waiter is blocked on a row lock and wants to abort the blocker, the waiter can consult the policy manager before taking the action to abort the blocker. Regarding the abort rules, the rules can be configured for any suitable level of complexity or control, e.g., to obtain to get maximum control over when and whether to abort a blocker.

An abort manager 308 is also provided to implement transaction aborts. The abort manager in some embodiments may be implemented as a stand-alone component in the system to abort transactions. Alternatively, the abort manager may be implemented as a mechanism within the transaction itself to abort a transactions. For example, this mechanism may be included such that the waiting transaction includes an abort manager module to initiate the abort of a blocking transaction. As yet another alternative, the blocking transaction may include an abort manager module so that it can self-abort when instructed to do so.

While not shown in the figure, the system may also include a lock manager (LM) or a distributed lock manager (DLM). The LM/DLM provides a lock request interface/API to acquire a lock on a resource, e.g., the row lock 306 shown in the figure that locks row 2 in table 304.

The system also includes a set of transactions 312 that are operating to perform work in the system. In the current figure, Transaction B is currently holding an exclusive lock (row lock 306) on row 2 in table 304. Transaction B is identified as being a low priority transaction.

Figure 3B:
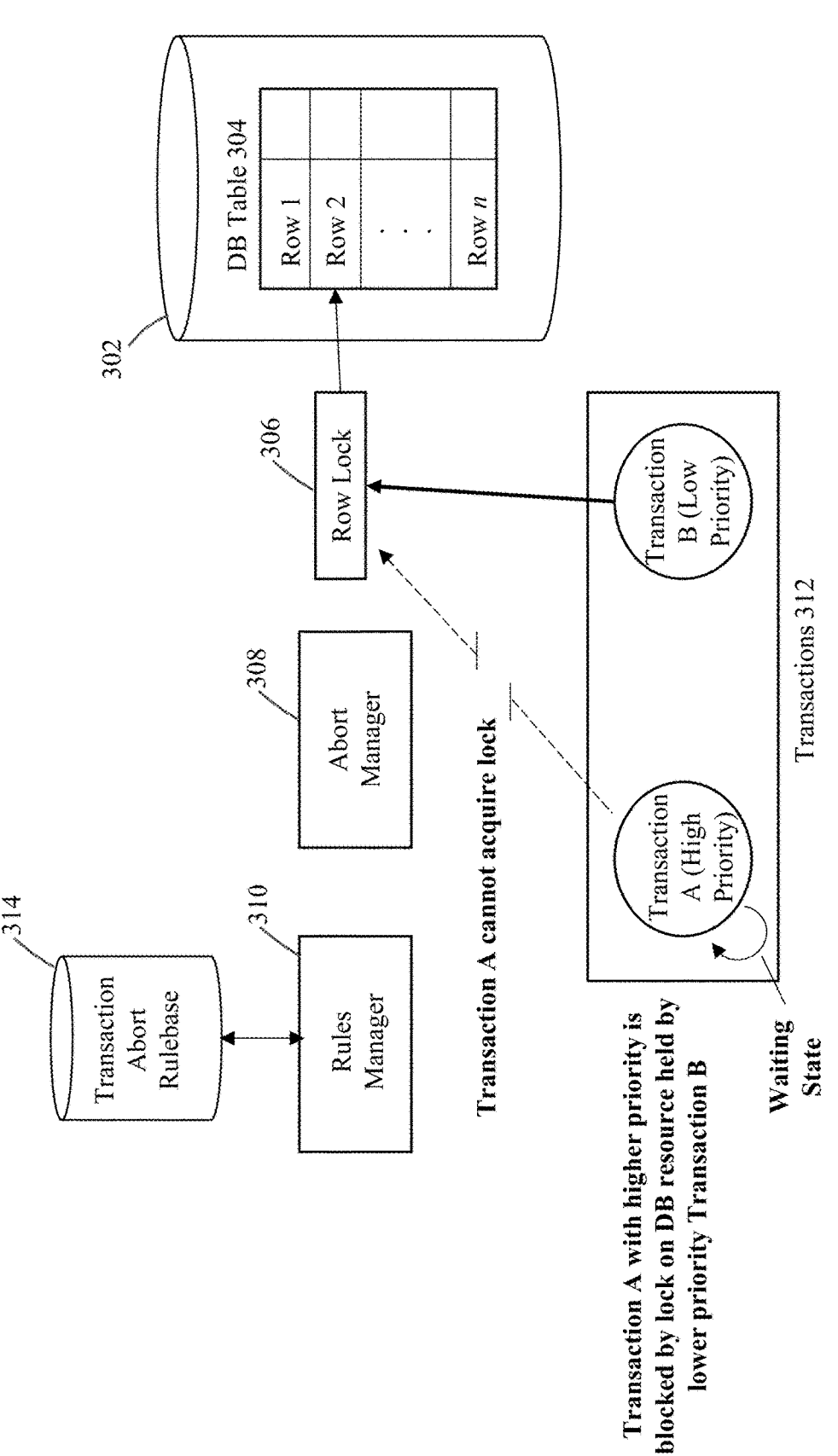

Consider the situation shown in FIG. 3B. Here, another transaction (Transaction A) is now waiting in the system to perform its work. Transaction A is in a waiting state because it needs to operate upon row 2 in table 304, but is unable to do because Transaction B is currently holding an exclusive lock on that same resource. Because Transaction B is holding an exclusive lock, this means that no other entity will be able to acquire a conflicting lock on that resource until that exclusive lock is released by Transaction B. Since Transaction A will need to acquire a lock on row 2 in order to do its work, but is unable to do so because of the exclusive lock held by Transaction B, this means that Transaction A must be placed into its waiting state until the exclusive lock has been released.

This situation may occur, for example, because concurrent writes to a row need to be serialized to provide ACID guarantees to the application. Therefore, a write database transaction acquires a lock on each row that it wants to modify. A rowlock provides exclusive access to a row to a transaction. But rowlocks must be held for the duration of a transaction. If the transaction does not commit or rollback for a long time while holding rowlocks, it can potentially block other conflicting transactions. This impacts the database latency and reduces transaction throughput. There are multiple reasons why row locks can be held for a long time, e.g., where the application hits an exception after beginning a transaction leaving the transaction.

FIG. 2 provides an approach to handle this situation according to embodiments of the invention. At step 202, blocker discovery/identification is performed. When a waiter transaction is forced to wait, it may not be entirely clear which other entity is the blocker transaction that is causing the wait for the waiter transaction. This step is performed to identify the blocker transaction, particularly to see if the blocker transaction has a lower priority than the waiter transaction.

Any suitable approach can be taken to perform blocker discovery/identification. One possible approach is to query the LM/DLM to request the identity of the specific entity that is holding a conflicting lock. This approach is beneficial in that it is a straightforward way to directly identify the holder of a lock. However, if the LM/DLM is resident on another node, then this approach may require messaging generation operations and network roundtrips that create excessive latencies and delays.

Another possible approach is in the context of a clustered system, where the waiter transaction and the blocker transaction may be on different instances altogether. In general, this approach uses ITL (Interested transaction list) information to get the blocker's XID, a Tx table (transaction table) to get the blocker's priority, and Tx enq (lock) to know which instance and session the blocker is currently running.

As a detailed explanation, with this approach, the waiter can identify the blocker's instance/node and its priority by using a transaction table (Tx table) on shared disk, which is accessible to all the nodes in the cluster. The Tx table stores metadata of a transaction. Therefore, given a transaction identifier (XID), the Tx table provides information such as whether the transaction is active or committed. The Tx table is augmented to store a transaction's priority. When a waiter transaction cannot get the rowlock within a specified time, it gets the blocker's XID from the ITL of the data block. The ITL is a portion in the data block which contains information about transactions that are currently active in that data block. Using the blocker's XID, the waiter queries the Tx table to get the priority of the blocker transaction. The DLM maintains a lock (TX enq) per XID so that transactions can wait on the lock in case the rowlock is held. There is a single TX enq per transaction irrespective of the number of rowlocks it holds. The TX enq of the blocker transaction stores information about the blocker such as the instance it is running and the session information. This allows the waiting transaction to query the DLM using the XID to fetch and obtain the blocker's instance and session information.

Figure 3C:
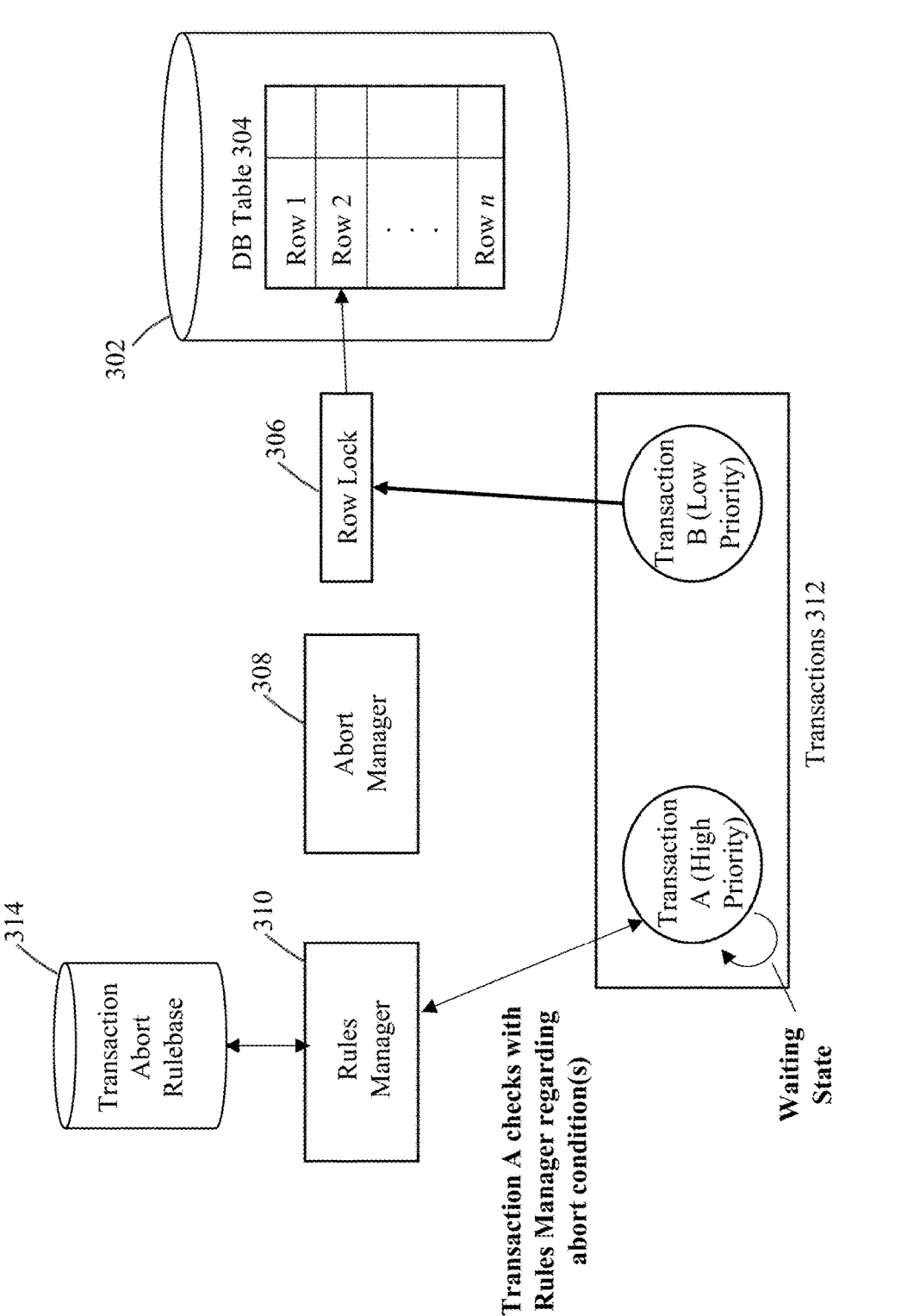
Figure 3D:
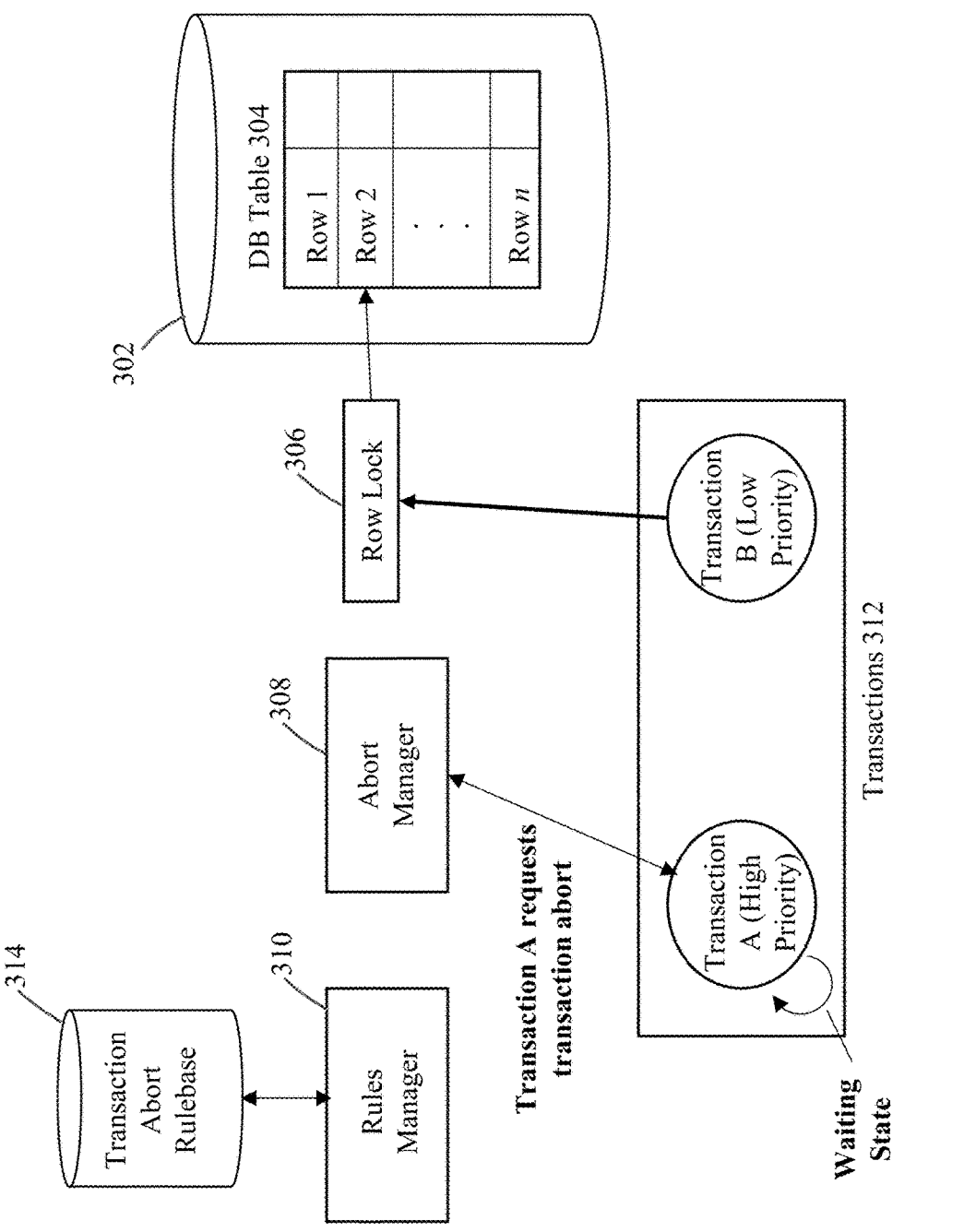

After the blocker has been identified, then at step 204, the rules manager can be consulted to check on the applicable rules conditions for the current situation. By this point, the waiter transaction should know its own priority and the blocker's priority as well. Therefore, as shown in FIG. 3C, the rules manager is checked for the applicable conditions under which an abort may take place.

Based on the waiter's priority and the rules configured in the rules manager, the waiter determines at step 206 whether it can abort a blocker. If the waiter's priority is such that it cannot abort a blocker of any priority, then the waiter tries to acquire the rowlock with infinite timeout. Otherwise, the waiter will query the wait_target and uses it as the timeout to acquire the row lock. Wait_target is a database parameter to specify the maximum duration a transaction with specific priority waits before a blocker is autonomously aborted.

Figure 3E:
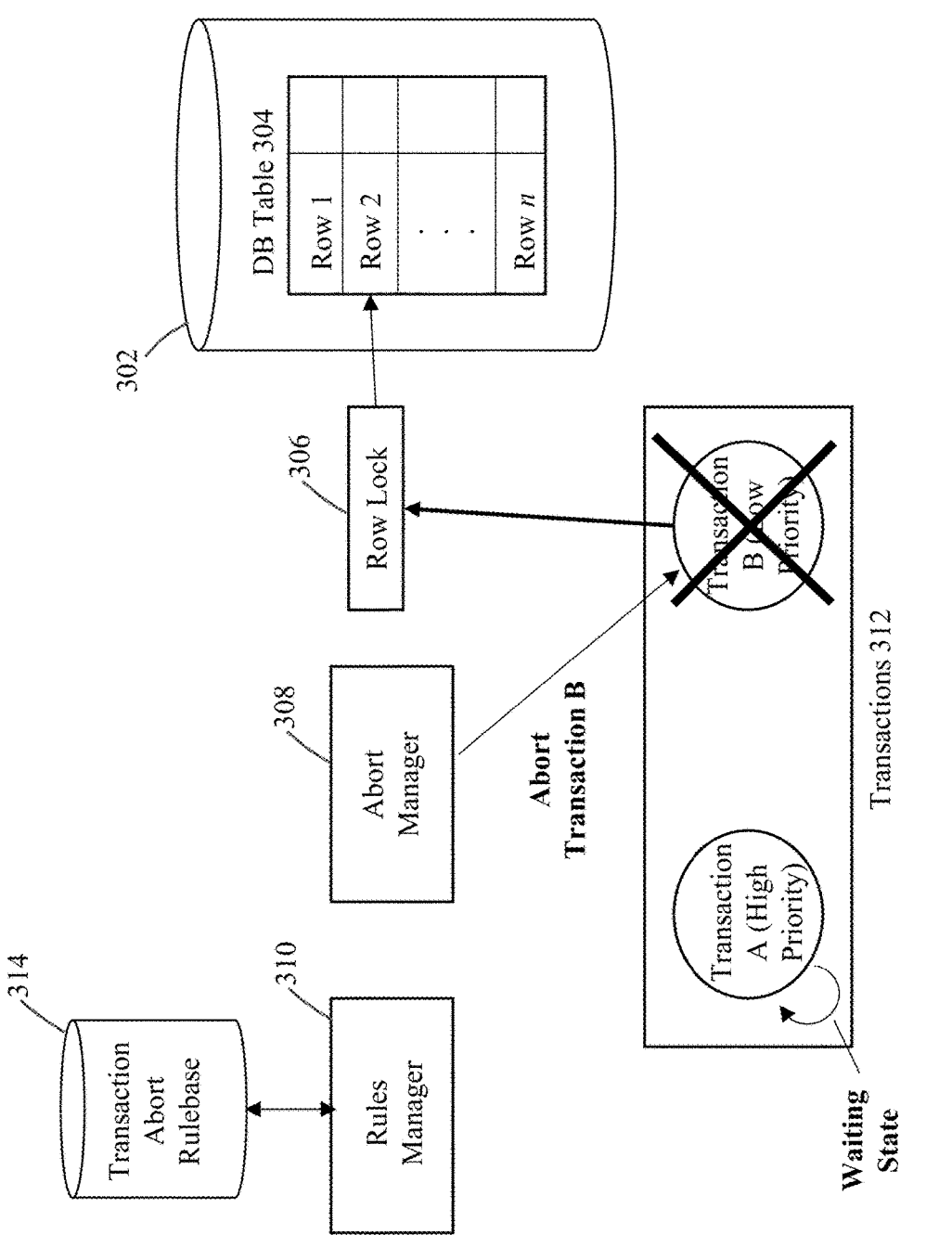

If the abort conditions are met (e.g., the time frame of the wait target has elapsed), then at step 208, the abort manager is contacted to effect the transaction abort operation. This is illustratively shown in FIG. 3D. As illustrated in FIG. 3E, this causes the abort manager to abort the blocker transaction (step 210). Any suitable approach can be taken to implement the abort processing. For example, the transaction can be aborted by using a session kill, a transaction abort, and/or a voluntary or forced abort.

In some embodiments, the abort processing is performed using the blocker details that have been obtained, e.g., from the distributed lock manager. Using those details, the waiter sends a message to the instance where the blocker is running with waiter's priority and blocker's session information as the payload. The message handler on the receiver queries the blocker's priority. With the waiter's priority and blocker's priority in hand, the message handler queries the rules manager on whether the blocker can be aborted. The blocker is aborted by killing its session and/or signaling the process to abort.

Figure 3F:
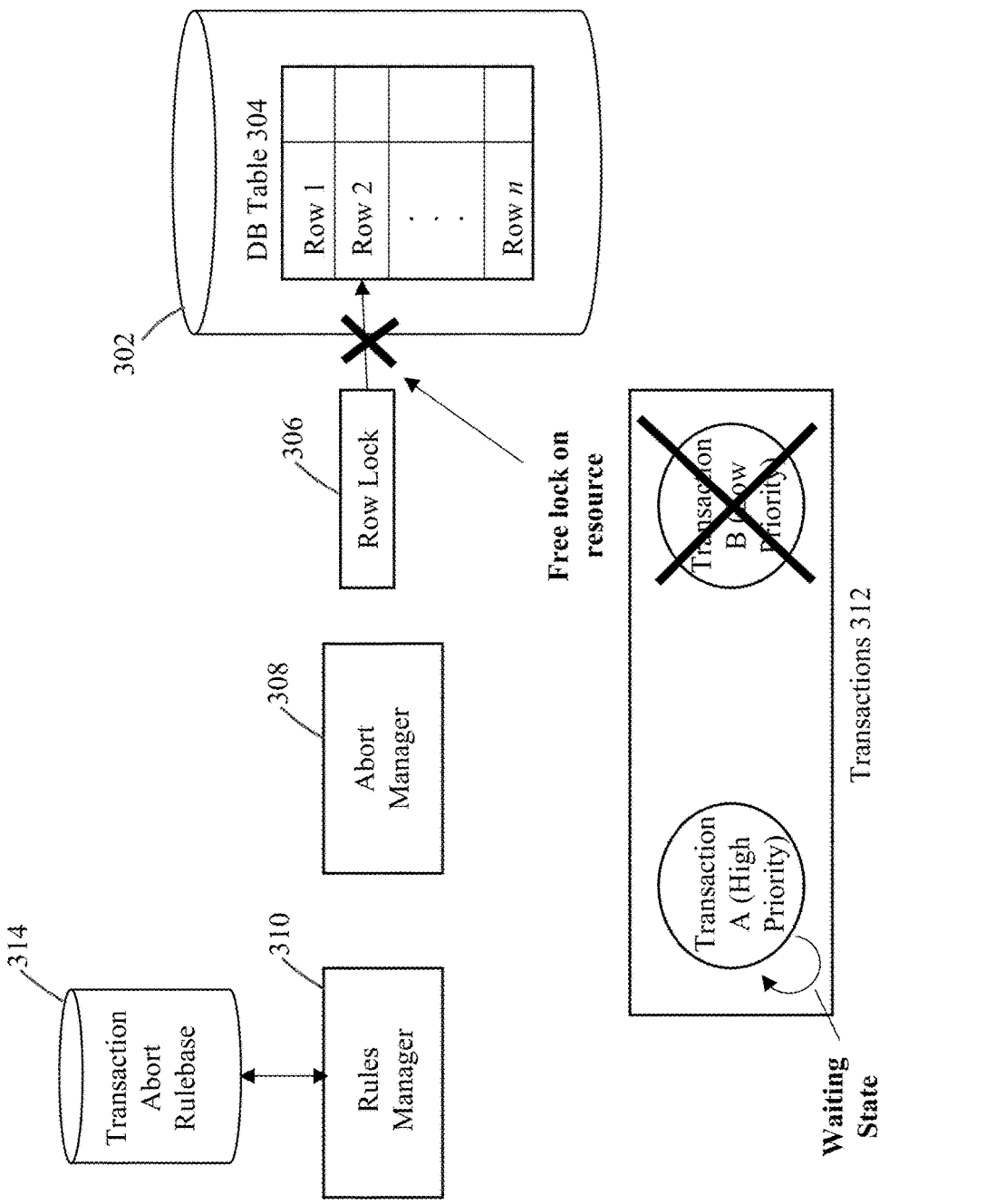
Figure 3G:
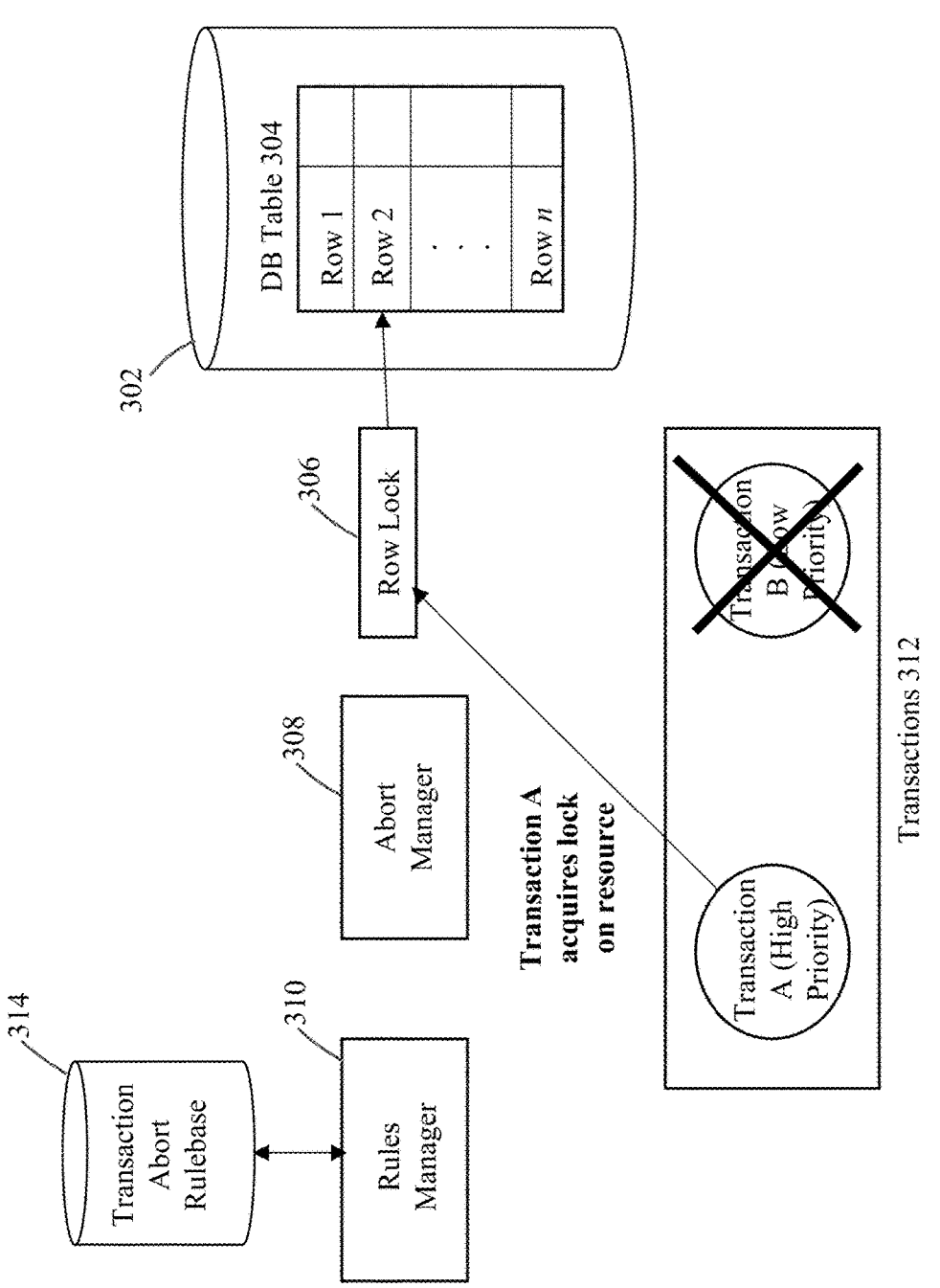

After the Transaction B has been aborted, then clean-up operations are performed in the system relative to the aborted transaction. As shown in FIG. 3F, the clean-up operations include the release of the lock 306 that was previously held by Transaction B. At this point, another transaction will now be free to acquire a lock on the underlying resource (row 2 of table 304). Therefore, as shown in FIG. 3G, Transaction A has now acquired lock 306 on the desired database resource. Transaction A is no longer a waiter transaction since it is not being blocked any longer and can process its work at this point.

Figure 4A:
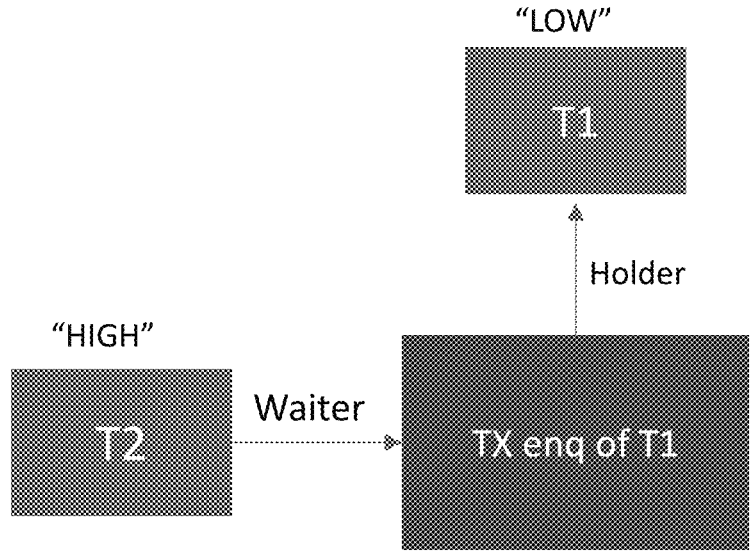
FIGS. 4A-B provide an illustration of the application of the inventive technique to a scenario with a high priority waiter and a low priority blocker.
Figure 4B:
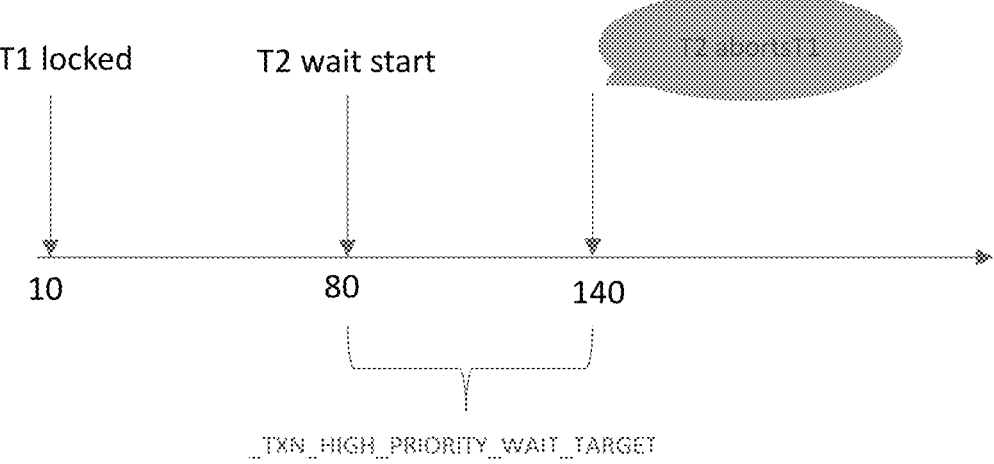

FIGS. 4A-B provide an illustration of the application of the inventive technique to a scenario with a high priority waiter and a low priority blocker. Here, as shown in FIG. 4A, Transaction T1 is at a low priority and transaction T2 is at a high priority. The wait target for the high priority transaction is set to 60 seconds in this example.

As shown in FIG. 4B, T1 has an enqueue at time 10 and T2 waits for the enqueue at time 80. In this situation, the waiter's priority is greater than the blocker's priority. Therefore, since the waiter has been blocked for 60 secs at time 140, this means that T2 will abort T1 at time 140.

Figure 5A:
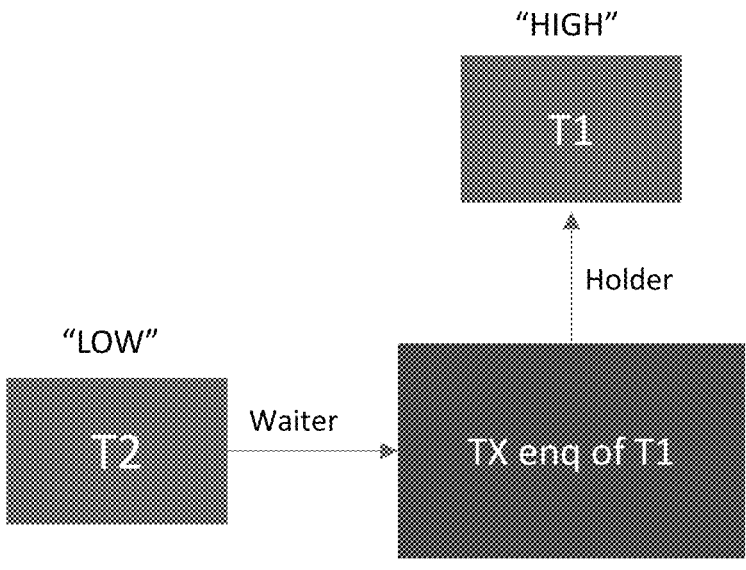
FIGS. 5A-B provide an illustration of a scenario with a low priority waiter and a high priority blocker.
Figure 5B:
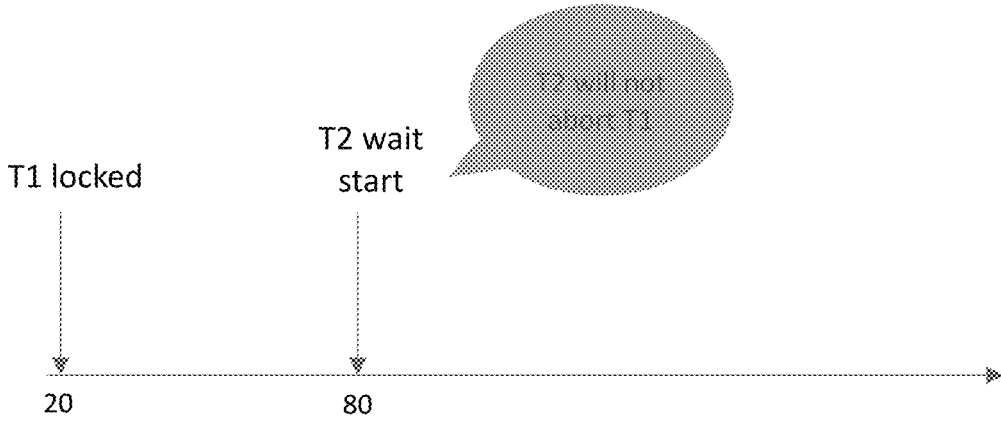

FIGS. 5A-B provide an illustration of a scenario with a low priority waiter and a high priority blocker. Here, as shown in FIG. 5A, Transaction T1 is at a high priority and transaction T2 is at a low priority.

As shown in FIG. 5B, T1 has an enqueue at time 20 and T2 waits for the enqueue at time 80. In this situation, the waiter's priority is less than the blocker's priority. Therefore, T2 cannot abort the T1 transaction.

Figure 6A:
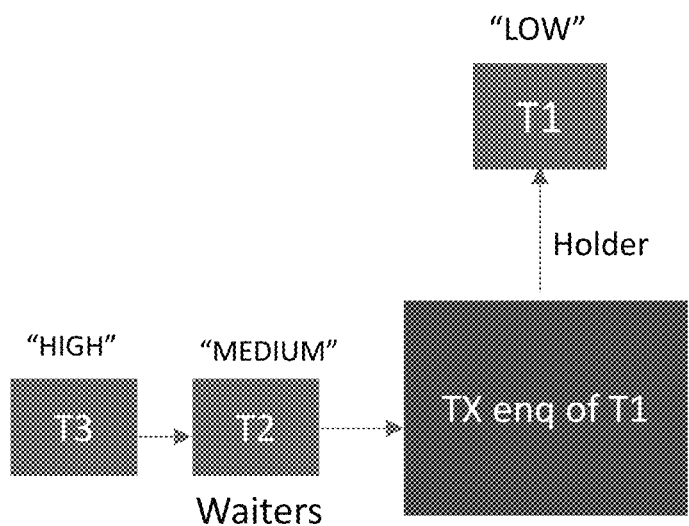
FIGS. 6A-B provide an illustration of the application of the inventive technique to a scenario with multiple waiters.
Figure 6B:
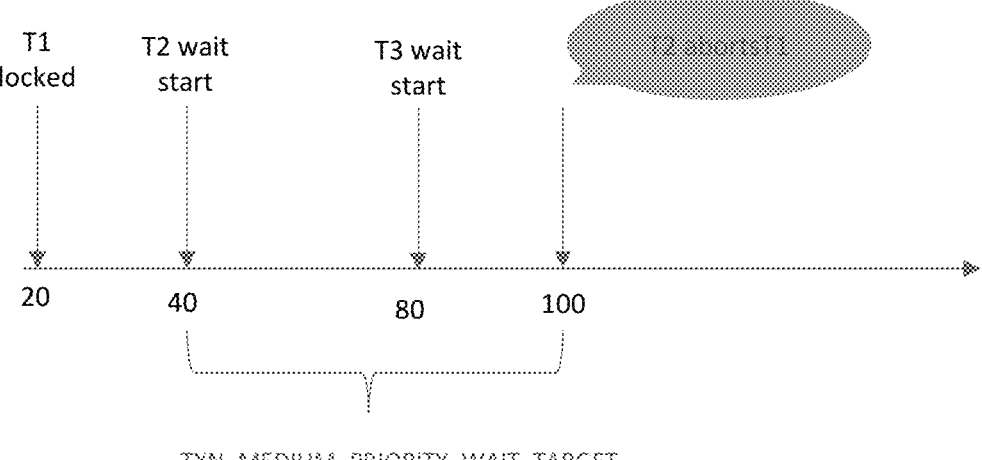

FIGS. 6A-B provide an illustration of the application of the inventive technique to a scenario with multiple waiters. Here, as shown in FIG. 4A, Transactions T1 that currently holds the lock (blocker) is at a low priority. There are two waiters, including T2 and T3. T2 is at a medium priority level and T3 is at a high priority level. The TXN_HIGH_PRIORITY_WAIT_TARGET=30 secs for the high priority transactions. The TXN_MEDIUM_PRIORITY_WAIT_TARGET=60 secs for the medium priority transactions.

As shown in FIG. 6B, the blocker transaction T1 held the enqueue at time 20. One of the waiter transactions T2 waits for the enqueue at time 40, while the other waiter transaction T3 enqueues at time 80.

In this situation, both of the waiters have a priority level that is higher than the blocker's priority level. Therefore, whichever of the wait times for the waiters that expires first will cause the blocker to be aborted. In this situation, the wait time for the T2 transaction expired first, at time 100. Therefore, transaction T2 will abort T1 at time 100.

Figure 7:
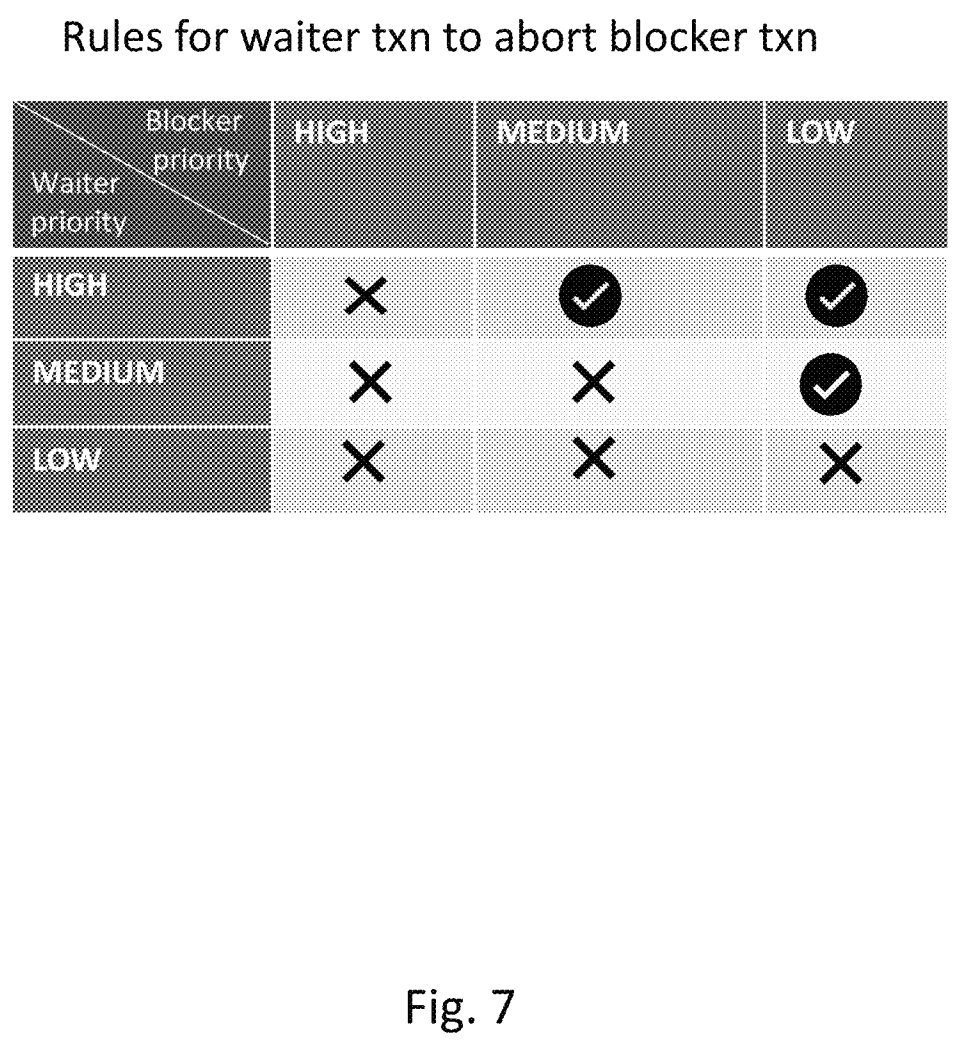

FIG. 7 shows a chart/interface for setting the priority levels and associated abort rules for the respective priority levels. In this example, the rules are configured so that that waiter transaction with HIGH priority can only abort MEDIUM and LOW priority blocker transactions, or a transaction with "LOW" priority cannot abort any transaction.

More complex rules may also be employed in conjunction with embodiments of the invention. For example, a more complex "wait target" rule can be implemented, where wait targets can be configured granularly. By way of illustration, a DBA may configure the rule such that a high priority transaction has to wait for 2 minutes to abort a medium priority blocker transaction, whereas it has to just wait for 20 secs to abort a low priority blocker transaction.

Another complex rule may be established for a priority comparison. This rule determines whether blocker can be aborted by comparing the priorities of the waiter and the blocker. This rule be configured granularly for each priority. For example, the rule for a high priority waiter can be that it can only abort medium or low priority blocker transactions and but it cannot abort a high priority blocker transaction. The abort rule for a low priority waiter can be that it cannot abort any priority transaction.

Yet another rule may address a target completion time. The idea behind this rule is that the wait time rule discussed above would not be the only time period used for the abort condition. Instead, the rule condition can also look at the estimated completion time for a blocker transaction. The Target Completion Time corresponds to the best estimate for the time that a transaction would take to complete as determined by the application or by the DBA. In one possible embodiment, when this rule is configured, the waiter would wait for MAX(wait_target, target_complete_on_me) before aborting the blocker.

This option may be configured to give the ability for a transaction itself to provide its target completion time. This can be set per-priority by the DBA or it can be set per-transaction by the application. The time set by the application will take precedence over the global value set by the DBA. For example, an application performing batch jobs can be set for 15 minutes, while set for 10 seconds for OLTP (online transaction processing) transactions. This provides less scope for accidental aborts where the blocker has not released the row lock because it is really doing some work rather than any exception in the application.

Blocker timeouts can also be set. If there is only a single waiter and a single blocker, then the blocker timeout and the waiter timeout period would essentially be the same. However, consider the various situations where there may be different numbers of waiters and/or blockers. With multiple waiters/blockers, the start times and conditional wait times for the different waiters/blockers may affect the actual time at which an abort occurs, which means that in some cases, the timeout period is a blocker timeout period whereas in other cases it is a waiter timeout period.

Another rule pertains to a blocker awareness check. When this rule is turned on, the waiter would check for the activeness of the blocker before aborting it. The activeness of the blocker can be determined using various mechanisms, for example, by monitoring the redo logs, based on the number of locks that it is attempting to take or based on some other heuristics. If a blocker transaction is active on the database based on this rule, the waiter will back off and try to abort it at a later point in time.

A rule may be configured for the size and/or quality of the waiter queue. This rule states that a single waiter on a row lock may not enough to abort the blocker; there may need to be enough quantity of waiters waiting on the same lock to abort the blocker. There is also possibility to set the size of the wait list per priority, for example, where the application or DBA can state that there needs to at least a certain number of high priority waiters to abort a medium priority blocker, whereas a lesser number of waiters is needed for a low priority blocker.

In some embodiments, a "demo" mode may be used to select one or more parameters for the rules. For example, consider the selection of a wait target value. If the configured wait target is too large, an application/transaction may need to an excessively long time for the blocker to be aborted. If the configured wait target is too small, then transactions (e.g., transactions that are not in an excessively hung state) may be unnecessarily aborted. With the demo mode, the database would just increment some statistics instead of actually aborting the blocker transactions. The statistics are maintained that would aid in selecting the wait target value, e.g., with regards to a number of transactions that are aborted because of HIGH/MEDIUM wait target parameters. When the application is running normally, an approximate wait target value is selected and these statistics are monitored. In a normally running system, no transaction should be aborted because of this feature. However, if the database aborts any transactions with this setting, this means that wait target value has to be increased. The same method is repeated until no transactions are aborted with the particular setting of the wait target, and thereafter the demo mode is disabled.

Therefore, what has been described is an improved approach to autonomously abort a lower priority transaction that is blocking a higher priority transaction, where the lower priority transaction is holding a lock on a resource for which there is contention. Some embodiments also provide an efficient approach for identification of a blocker transaction, which drastically reduces the response time to abort the blocker transaction.

This approach provides higher availability to the application since the database autonomously aborts the blocker transaction. Without this method, DBAs would have to manually identify and abort the blocker transaction thereby causing downtime to the application. This approach is efficient as it relies on a local state rather than the global state of all the locks in the system, and the blocker identification can be performed in constant time. This approach is scalable as it does not depend on the number of nodes, the number of locks or the number of transactions in the cluster. New aspects provided by embodiments of the invention include the configuration of priorities, e.g., through the application using session-level parameters.

System Architecture

Figure 8:
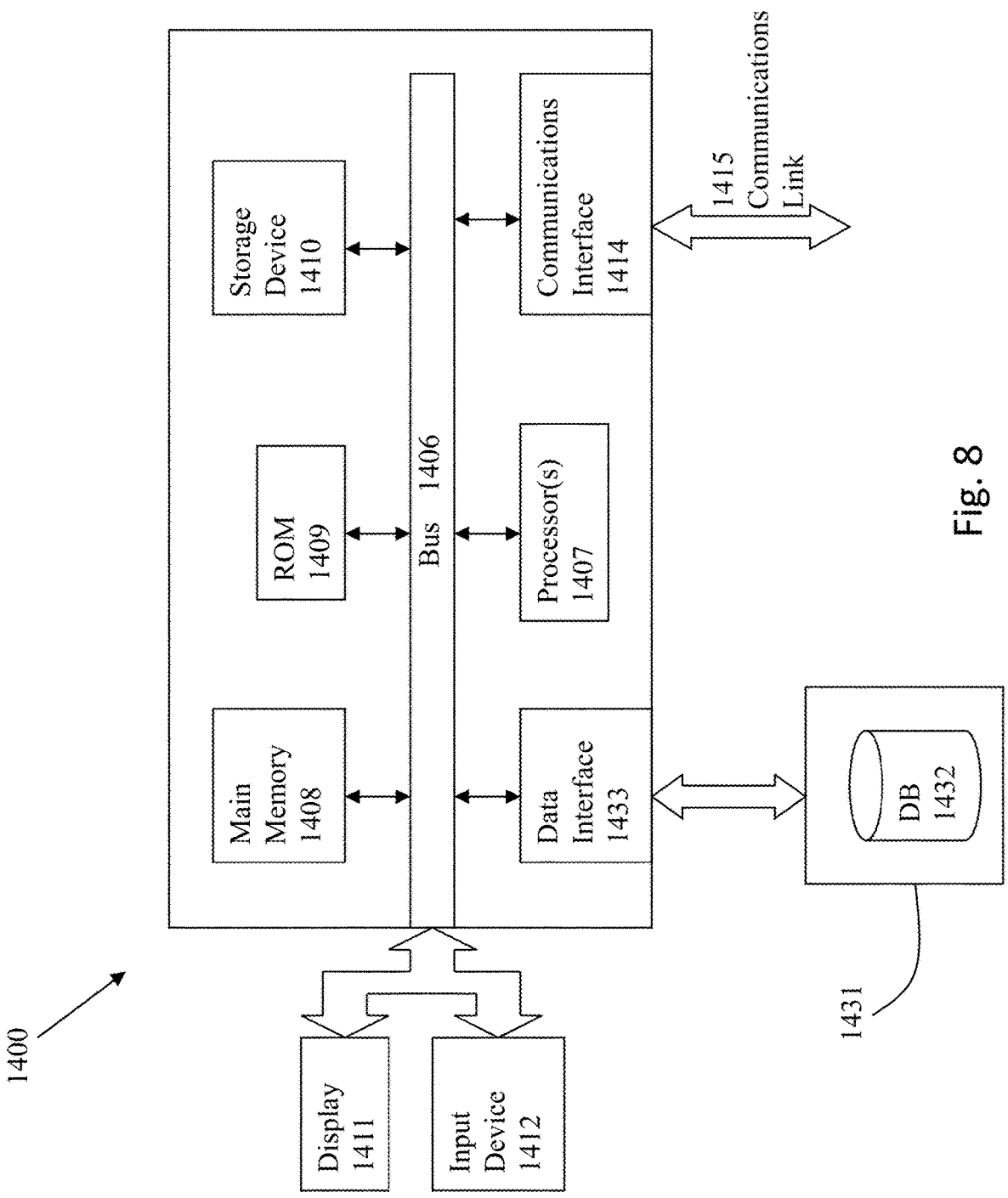
FIG. 8 is a block diagram of an illustrative computing system suitable for implementing an embodiment of the present invention.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to some embodiments of the invention, computer system 1400 performs specific operations by processor 1407 executing one or more sequences of one or more instructions contained in system memory 1408. Such instructions may be read into system memory 1408 from another non-transitory computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of non-transitory computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1410 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. A database 1432 in a storage medium 1431 may be used to store data accessible by the system 1400.

The techniques described may be implemented using various processing systems, such as clustered computing systems, distributed systems, and cloud computing systems. In some embodiments, some or all of the data processing system described above may be part of a cloud computing system. Cloud computing systems may implement cloud computing services, including cloud communication, cloud storage, and cloud processing.

Figure 9:
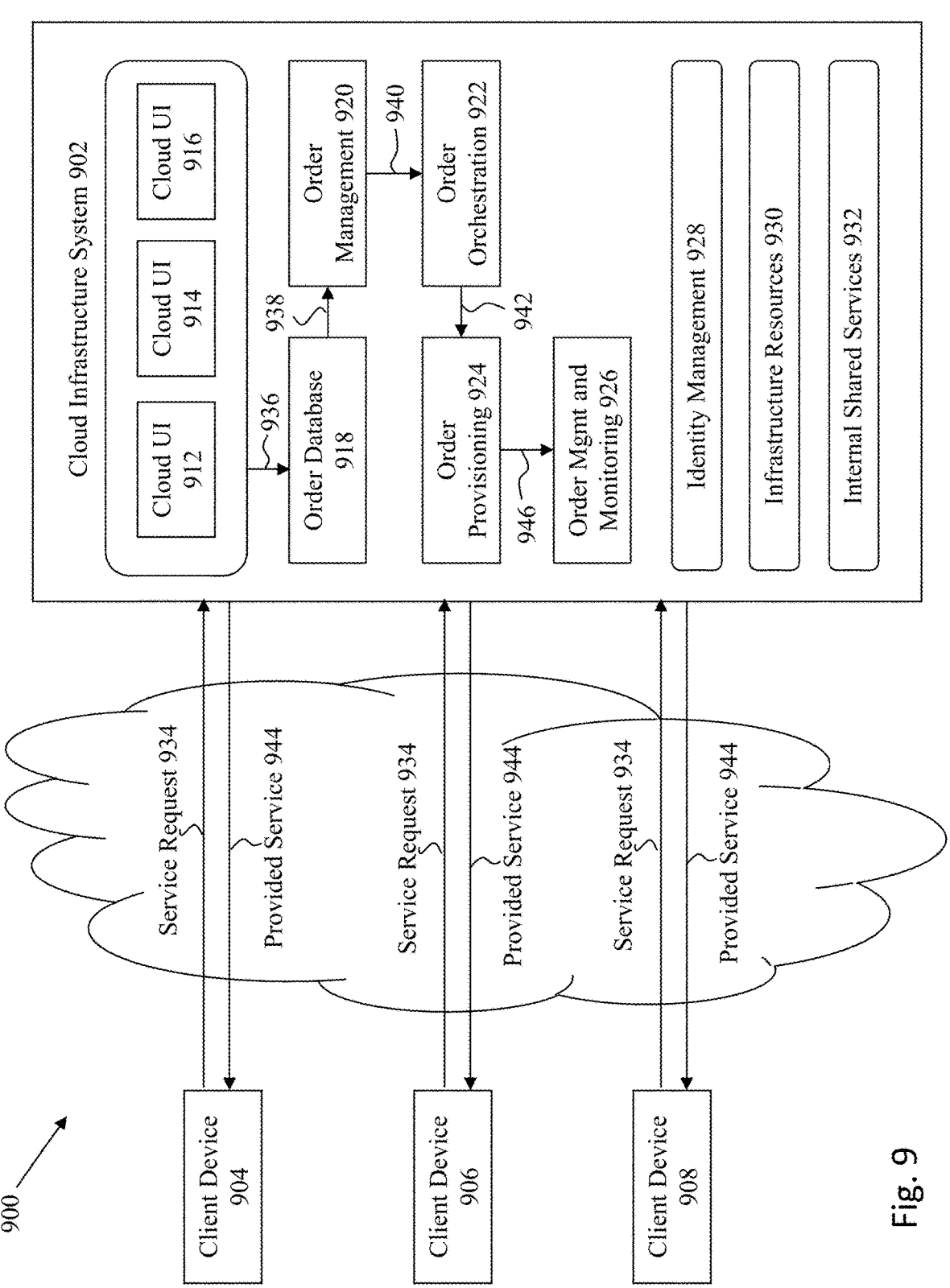
FIG. 9 is a block diagram of one or more components of a system environment in which services may be offered as cloud services, in accordance with an embodiment of the present invention.

FIG. 9 is a simplified block diagram of one or more components of a system environment 900 by which services provided by one or more components of an embodiment system may be offered as cloud services, in accordance with an embodiment of the present disclosure. In the illustrated embodiment, system environment 900 includes one or more client computing devices 904, 906, and 908 that may be used by users to interact with a cloud infrastructure system 902 that provides cloud services. The client computing devices may be configured to operate a client application such as a web browser, a proprietary client application, or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the embodiment shown in the figure is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above. Although system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols. Cloud infrastructure system 902 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform.

In some embodiments, resources in cloud infrastructure system 902 may be shared by multiple users and dynamically re-allocated per demand. Additionally, resources may be allocated to users in different time zones. For example, cloud infrastructure system 902 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In operation 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI), cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

After an order has been placed by the customer, the order information is received via the cloud UIs, 912, 914 and/or 916. At operation 936, the order is stored in order database 918. Order database 918 can be one of several databases operated by cloud infrastructure system 918 and operated in conjunction with other system elements. At operation 938, the order information is forwarded to an order management module 920. In some instances, order management module 920 may be configured to perform billing and accounting functions related to the order, such as verifying the order, and upon verification, booking the order. At operation 940, information regarding the order is communicated to an order orchestration module 922. Order orchestration module 922 may utilize the order information to orchestrate the provisioning of services and resources for the order placed by the customer. In some instances, order orchestration module 922 may orchestrate the provisioning of resources to support the subscribed services using the services of order provisioning module 924.

In certain embodiments, order orchestration module 922 enables the management of business processes associated with each order and applies business logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the customer. Order provisioning module 924 provides a level of abstraction between the cloud services provided by cloud infrastructure system 902 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to customers on client devices 904, 906 and/or 908 by order provisioning module 924 of cloud infrastructure system 902.

At operation 946, the customer's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain embodiments, cloud infrastructure system 902 may include an identity management module 928. Identity management module 928 may be configured to provide identity services, such as access management and authorization services in cloud infrastructure system 902. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method executed in a computerized database system to abort a database transaction, the computer-implemented method comprising:

configuring a first transaction priority level for a first database transaction comprising one or more computer operations executable in the computerized database system;

configuring a second transaction priority level for a second database transaction comprising one or more computer operations executable in the computerized database system, the first and second database transactions both requiring the same one or more rows within a table of a database of the computerized database system;

identifying that the first database transaction is blocking the second database transaction, wherein the first database transaction, by execution of a computer operation of the computerized database system, at least partially executes and is blocking the second database transaction from executing by holding a lock on the one or more rows within the table of the database;

determining if an abort condition of the second transaction priority level is higher than the first transaction priority level is met; and aborting the first database transaction based at least in part on the abort condition being met, wherein aborting the first database transaction comprises executing a computer operation in the computerized database system that releases the lock held by the first database transaction to the one or more rows in the database table.

2. The computer-implemented method of claim 1, wherein the abort condition is based upon a time wait target for the second transaction priority level, wherein the abort condition is met upon expiration of the time wait target.

3. The computer-implemented method of claim 1, wherein a priority level for a database transaction is imposed by configuring the priority level for a session including the database transaction, and the priority level is inherited by the database transaction that is within the session.

4. The computer-implemented method of claim 1, wherein the first transaction priority level and the second transaction priority level are automatically configured based at least upon at least one of a service characteristic, a user characteristic, a data characteristic, or a query characteristic.

5. The computer-implemented method of claim 1, wherein blocker transaction identification is performed by at least one of querying a lock manager of the database system or checking a transaction table of the database system.

6. The computer-implemented method of claim 1, wherein a rule manager of the database system is consulted to determine whether the abort condition is met, the abort condition corresponding to a rule managed by the rule manager.

7. The method of claim 1, wherein the first database transaction is aborted by performing at least one computer operation to execute a session kill, a transaction abort, a voluntary abort, or a forced abort.

8. The computer-implemented method of claim 1, wherein the second database transaction subsequently accesses a row that was previously locked by the lock held by the first database transaction.

9. The computer-implemented method of claim 1, wherein the database comprises a relational database, and computer operations are executed using structured query language (SQL).

10. The computer-implemented method of claim 6, wherein rules managed by the rule manager govern when a blocking database transaction can be autonomously aborted in favor of higher priority database transaction.

11. The computer-implemented method of claim 1, wherein the first database transaction self-aborts based at least in part on the abort condition of the second transaction priority level being higher than the first transaction priority level being met.

12. The computer-implemented method of claim 1, the database of the computerized database system comprising a transactions table comprising respective columns for respective transaction entries identifying respective priority levels for respective transactions.

13. A non-transitory computer program product embodied on a computer usable medium, the non-transitory computer readable medium having stored thereon a sequence of instructions which, when executed by a processor causes the processor to execute actions in a computerized database system to abort a database transaction, the actions comprising:

configuring a first transaction priority level for a first database transaction comprising one or more computer operations executable in the computerized database system;

configuring a second transaction priority level for a second database transaction comprising one or more computer operations executable in the computerized database system, the first and second database transactions both requiring the same one or more rows within a table of a database of the computerized database system;

identifying that the first database transaction is blocking the second database transaction, wherein the first database transaction, by execution of a computer operation of the computerized database system, at least partially executes and is blocking the second database transaction from executing by holding a lock on the one or more rows within the table of the database;

determining if an abort condition of the second transaction priority level is higher than the first transaction priority level is met; and aborting the first database transaction based at least in part on the abort condition being met, wherein aborting the first database transaction comprises executing a computer operation in the computerized database system that releases the lock held by the first database transaction to the one or more rows in the database table.

14. The non-transitory computer program product of claim 13, wherein the abort condition is based upon a time wait target for the second transaction priority level, wherein the abort condition is met upon expiration of the time wait target.

15. The non-transitory computer program product of claim 13, wherein a priority level for a database transaction is imposed by configuring the priority level for a session including the database transaction, and the priority level is inherited by the database transaction that is within the session.

16. The non-transitory computer program product of claim 13, wherein the first transaction priority level and the second transaction priority level are automatically configured based at least upon at least one of a service characteristic, a user characteristic, a data characteristic, or a query characteristic.

17. The non-transitory computer program product of claim 13, wherein blocker transaction identification is performed by at least one of querying a lock manager of the database system or checking a transaction table of the database system.

18. The non-transitory computer program product of claim 13, wherein a rule manager of the database system is consulted to determine whether the abort condition is met, the abort condition corresponding to a rule managed by the rule manager.

19. The non-transitory computer program product of claim 13, wherein the first database transaction is aborted by performing at least one computer operation to execute a session kill, a transaction abort, a voluntary abort, or a forced abort.

20. The non-transitory computer program product of claim 13, wherein the second database transaction subsequently accesses a row that was previously locked by the lock held by the first database transaction.

21. A computer-based system, comprising:

a computer processor to execute a set of program code instructions;

a memory to hold the program code instructions, in which the program code instructions comprises program code for executing a process to abort a database transaction by configuring a first transaction priority level for a first database transaction comprising one or more computer operations executable in the computerized database system;

configuring a second transaction priority level for a second database transaction comprising one or more computer operations executable in the computerized database system, the first and second database transactions both requiring the same one or more rows within a table of a database;

identifying that the first database transaction is blocking the second database transaction, wherein the first database transaction, by execution of a computer operation of the computerized database system, at least partially executes and is blocking the second database transaction from executing by holding a lock on the one or more rows within the table of the database of the computerized database system;

determining if an abort condition of the second transaction priority level is higher than the first transaction priority level is met; and aborting the first database transaction based at least in part on the abort condition being met, wherein aborting the first database transaction comprises executing a computer operation in the computerized database system that releases the lock held by the first database transaction to the one or more rows in the database table.

22. The computer-based system of claim 21, wherein the abort condition is based upon a time wait target for the second transaction priority level, wherein the abort condition is met upon expiration of the time wait target.

23. The computer-based system of claim 21, wherein a priority level for a database transaction is imposed by configuring the priority level for a session including the database transaction, and the priority level is inherited by the database transaction that is within the session.

24. The computer-based system of claim 21, wherein the first transaction priority level and the second transaction priority level are automatically configured based at least upon at least one of a service characteristic, a user characteristic, a data characteristic, or a query characteristic.

25. The computer-based system of claim 21, wherein blocker transaction identification is performed by at least one of querying a lock manager of the database system or checking a transaction table of the database system.

26. The computer-based system of claim 21, wherein a rule manager of the database system is consulted to determine whether the abort condition is met, the abort condition corresponding to a rule managed by the rule manager.

27. The computer-based system of claim 21, wherein the first database transaction is aborted by performing at least one computer operation to execute a session kill, a transaction abort, a voluntary abort, or a forced abort.

28. The computer-based system of claim 21, wherein the second database transaction subsequently accesses a row that was previously locked by the lock held by the first database transaction.

\* \* \* \* \*